United States Patent [19]

Hileman et al.

[11] Patent Number: 5,287,244
[45] Date of Patent: Feb. 15, 1994

[54] COMPUTER HOUSING WITH LOW NOISE COOLING SYSTEM

[75] Inventors: Vincent P. Hileman; Robert J. Lajara, both of San Jose; Thomas E. J. Stewart, Sunnyvale; Nagaraj P. R. Mitty, San Jose; Joseph A. Tombari, Mountain View; William L. Grouell, San Ramon; Clifford B. Willis, Tracy; Steven J. Furuta, Santa Clara; Lawrence E. Piercey, San Jose; Loren R. Davidson, Sunnyvale, all of Calif.

[73] Assignee: Sun Microsystems, Inc., Mountain View

[21] Appl. No.: 885,527

[22] Filed: May 19, 1992

[51] Int. Cl.$^5$ ............................................. H05K 7/20
[52] U.S. Cl. ................................. 361/687; 361/692; 361/697; 364/708.1; 165/22
[58] Field of Search ............... 361/380, 383, 384, 395, 361/399; 364/708; 165/22

[56] References Cited

U.S. PATENT DOCUMENTS

| | | | |
|---|---|---|---|
| 4,479,198 | 10/1984 | Romano et al. | 364/708 |
| 4,702,154 | 10/1987 | Dodson | 361/384 |
| 4,756,473 | 7/1988 | Takemae et al. | 361/384 |
| 4,817,865 | 4/1989 | Wray | 361/384 |
| 5,051,868 | 9/1991 | Leverault et al. | 361/395 |

OTHER PUBLICATIONS

Gaunt et al, "Cooling Electrical Equipment", IBM Technical Disclosure Bulletin, vol. 20, No. 6, Nov. 1977, pp. 2428-2429.

*Primary Examiner*—Gregory D. Thompson
*Attorney, Agent, or Firm*—Blakely Sokoloff Taylor & Zafman

[57] ABSTRACT

The present invention is a computer housing with a low noise cooling system. The computer housing is comprised of two principal members, a cover and a base. Both a left surface and a right surface of the cover are perforated with vents to allowing the passage of air through the housing. The base additionally incorporates two air intake holes with a power source for the computer disposed over these air intake holes. The passage of air through the housing is facilitated through the use of three fans. These three fans are attached directly to the power source, and each of these fans operates at a different fan speed. The fan speeds are additionally adjusted in response to the outside ambient temperature. In operation, air enters the computer housing of the present invention through the vent array on the left surface of the cover, and the air intake holes in the base. The air is then channeled under the power source, dissipating the heat generated by the power source, blown across the components in the housing, and passed out of the housing through the vent array disposed on the left surface of the cover. The flow of air from one of the fans is advantageously deflected and channeled with a deflector.

18 Claims, 12 Drawing Sheets

FIG–1

FIG_2A

FIG_2B

FIG_3

FIG_5A

FIG_5B

FIG_5C

FIG_5D

FIG_5E

FIG_6A

FIG_6B

FIG—7

FIG_9A

FIG_9B

FIG_10A

FIG_10B

FIG_11

COMPUTER HOUSING WITH LOW NOISE COOLING SYSTEM

BACKGROUND OF THE INVENTION

1. Field of the Invention

The present invention relates to computer housings and computer cooling systems, and more particularly, to a computer housing with a low-noise cooling system.

2. Related Applications

This application is related to copending U.S. patent application Ser. No. 07/882,804, filed May 14, 1992, entitled "Modular Circuit Board Placement System," and copending U.S. patent application Ser. No. 07/883,533, filed May 15, 1992, entitled "Quick Connect Modular Unit Retainer Assembly with Damping."

3. Description of the Related Art

Computers typically utilize numerous components which generate heat. If not dissipated properly, this heat tends to degrade the performance of the computer, and under certain circumstances, can cause system failure. A desktop computer, for example, typically incorporates within a single housing numerous heat-producing components, including a power source, memory boards, a motherboard, one or more processors, and disk drive devices. The heat generated by these components is frequently dissipated through the use of an air cooling system in which air is passed through the computer housing from top to bottom, bottom to top, bottom to side, front to back, or a combination thereof. A fan typically facilitates the passage of air through the housing.

The dissipation of heat in a desktop computer becomes particularly significant when the capabilities of an existing desktop computer are enhanced with, for example, a new power source which provides greater power to the computer, or the use of more boards, or more processors. The need to enclose a greater number of components, each of which generates a greater amount of heat, within the same, or smaller size housing presents substantial heat dissipation problems.

Any design for a computer cooling system must further consider the problem of noise generated by the operation of the cooling system. High noise levels are undesirable to a computer user, tending to adversely affect user productivity and health. The operation of a large fan operating at a high speed within a desktop computer, for example, tends to cause an unacceptably high level of noise. Accordingly, a cooling system for a computer system should ideally provide dedicated and sufficient cooling at a low noise level.

SUMMARY OF THE INVENTION

The present invention is a desktop computer housing with a low noise cooling system. The computer housing is comprised of two principal members, a cover and a base. Both a left surface and a right surface of the cover are perforated with vents to allowing the passage of air through the housing. In particular, disposed on both of these surfaces are vent arrays composed of individual rectangular vents. These vents are in a swept back or "shark fin" venting pattern. The base additionally incorporates air intake holes and a grill with many holes which are utilized in the present invention to create an airflow under a power source for the computer. The power source is disposed over these air intake holes. In accordance with the present invention, the cooling system utilizes three fans. These three fans are attached directly to the power source. In addition, a plurality of fins are disposed laterally on the underside of the power source, serving as heat sinks, such that the heat produced by the power source is dissipated through the passage of air over the fins. In order to minimize noise levels and maximize air flow, these fins have rounded edges.

In operation, air enters the computer housing of the present invention through the vent array on the right surface of the cover, and the air intake holes in the base. The air is then channeled under and through the power source, dissipating the heat generated by the power source by passing over fins and passing through perforations in the power supply. The three fans then blow the air across the components in the housing, cooling the components, and the air exits the housing through the vent array disposed on the left surface of the cover. The flow of air from one of the fans is advantageously deflected and channeled with a deflector.

The three fans of the present invention each operate at different fan speeds, with each fan being supplied with a different voltage from a fan control circuit. The fan speeds are additionally adjusted in response to the outside ambient temperature. In particular, a thermistor provides a fan control circuit with electrical signals indicative of the outside ambient temperature, and the fan control circuit responsively adjusts the voltages supplied to three fans. Accordingly, under normal office conditions, the present invention provides for a computer housing with a low noise cooling system.

DETAILED DESCRIPTION OF THE INVENTION

Figure 1:
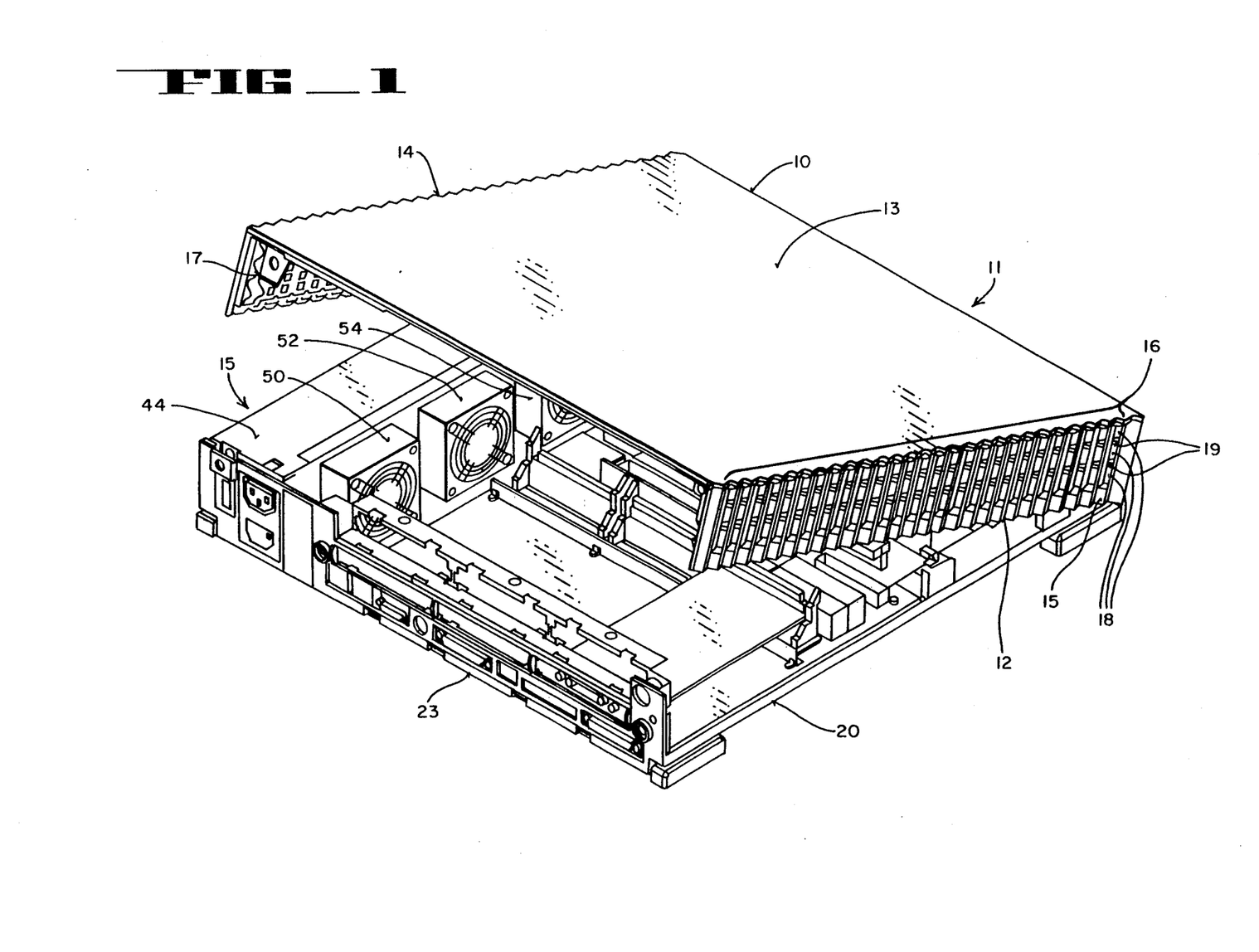
FIG. 1 illustrates a perspective view from the back of the computer housing of the present invention.

Referring to the drawings and the characters of reference marked thereon, the computer housing of the present invention is shown in FIG. 1. As illustrated, the computer housing is comprised of two principal members, a cover 10 and a base 20. The cover 10 is pivotally attached to the base 20 such that the cover 10 can be pivotally separated from the base 20 in the manner shown in this figure. The cover 10 includes a front surface 11 (not shown), a left surface 12, a right surface 14 (not shown), and a top surface 13. Both the left surface 12 and the right surface 14 are perforated with vents to allow the passage of air through the housing. In particular, as shown, the left surface 12 is perforated with a vent array 16. Vent array 16 is designed to maximize the amount of air flow through the housing, while also maintaining structural integrity. Vent array 16 is comprised of an array of individual vent columns, similar to vent column 15. Each of these individual vent columns is comprised of three individual rectangular vents which are separated, and thereby defined by, two structural braces. With respect to vent column 15, for example, the vent column is comprised of three rectangular vents 18 and two structural braces 19. The large rectangular vents of the present invention, in contrast to smaller, conventional round vents, allow greater amounts of air to flow through the computer housing, while maintaining requisite EMI protection.

Figure 2A:
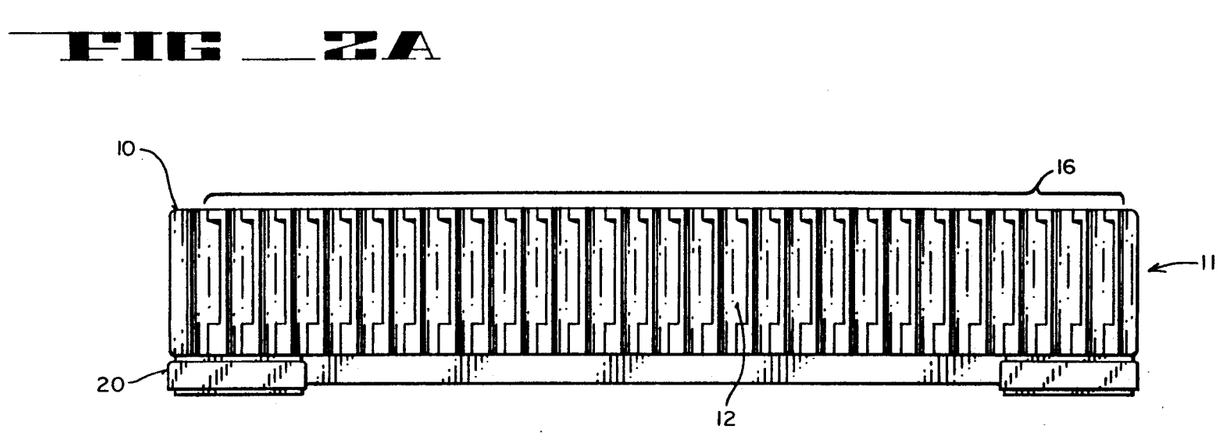
FIG. 2A is a left side view (with respect to the front) of the computer housing of the present invention showing the swept back venting pattern of the present invention.

Referring now to FIG. 2A, this figure illustrates the left side of the computer housing of the present invention. In this figure, the cover 10 is shown closed over the base 20. As illustrated, the left surface 12 of cover 10, as previously described, includes vent array 16. It will be appreciated from FIGS. 1 and 2A that vent array 16 incorporates a swept back or "shark fin" venting pattern such that the entry or exit of air from vent array 16 does not takes place at an angle perpendicular to the left surface 12, but instead, at an oblique angle. The use of a swept back pattern advantageously shields the components within the computer housing from the entry of foreign substances or objects from all but the oblique angle.

Figure 2B:
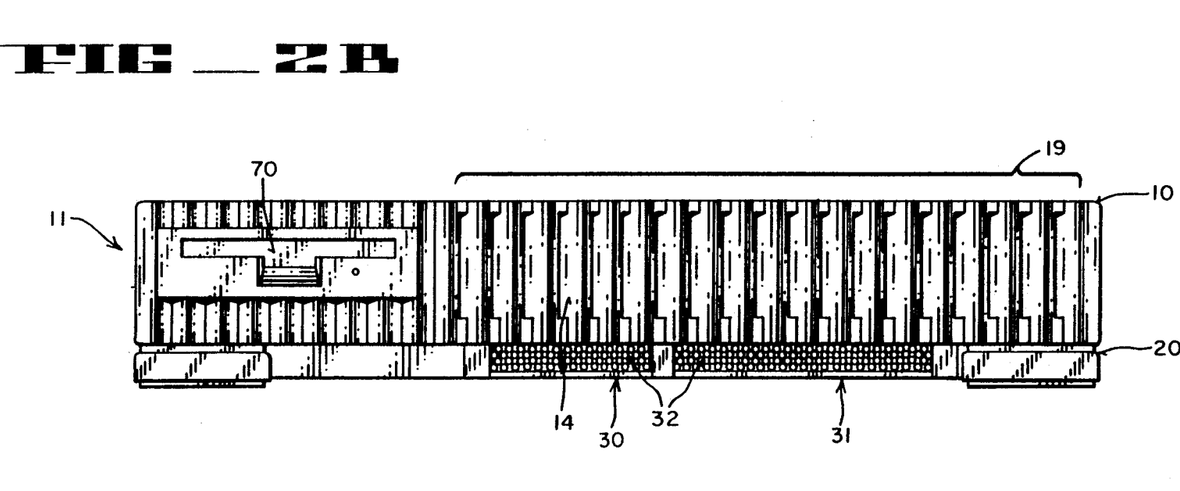
FIG. 2B is a right side view (with respect to the front) of the computer workstation housing of the present invention showing the swept back venting pattern of the present invention.

With respect to FIG. 2B, this figure illustrates a view of the right side of the computer housing of the present invention. In this figure, the cover 10 is also shown closed over the base 20. As illustrated, the right surface 14 of cover 10 also incorporates a vent array 19. Vent array 19 is similar in structure to the vent array 16 described with respect to FIGS. 1 and 2A, again, comprising vent columns, each vent column comprising three rectangular vents and two structural braces (not shown). It will be appreciated from FIG. 2B, that vent array 19 also incorporates a swept back or "shark fin" venting pattern such that the entry or exit of air from vent array 19 does not takes place at an angle perpendicular to right side 14, but instead, at an oblique angle.

As shown in FIG. 2B, the base 20, on this right side of the computer housing, incorporates two air intakes, air intake hole 30 and air intake hole 31. An intake grill 32 is disposed over air intake hole 30 and air intake hole 31 such that the entry of foreign substances or objects into the housing is prevented. As will be described, air intakes holes 30 and 31 are utilized in the present invention to create an airflow under the power source 44 (not shown in this figure) utilized by the desktop computer. Also shown in FIG. 2B is a disk drive opening 70 which allows a magnetic disk to be inserted through the right side 12 of cover 10, into a floppy disk drive 80 (not shown in this figure) within the computer housing.

Figure 3:
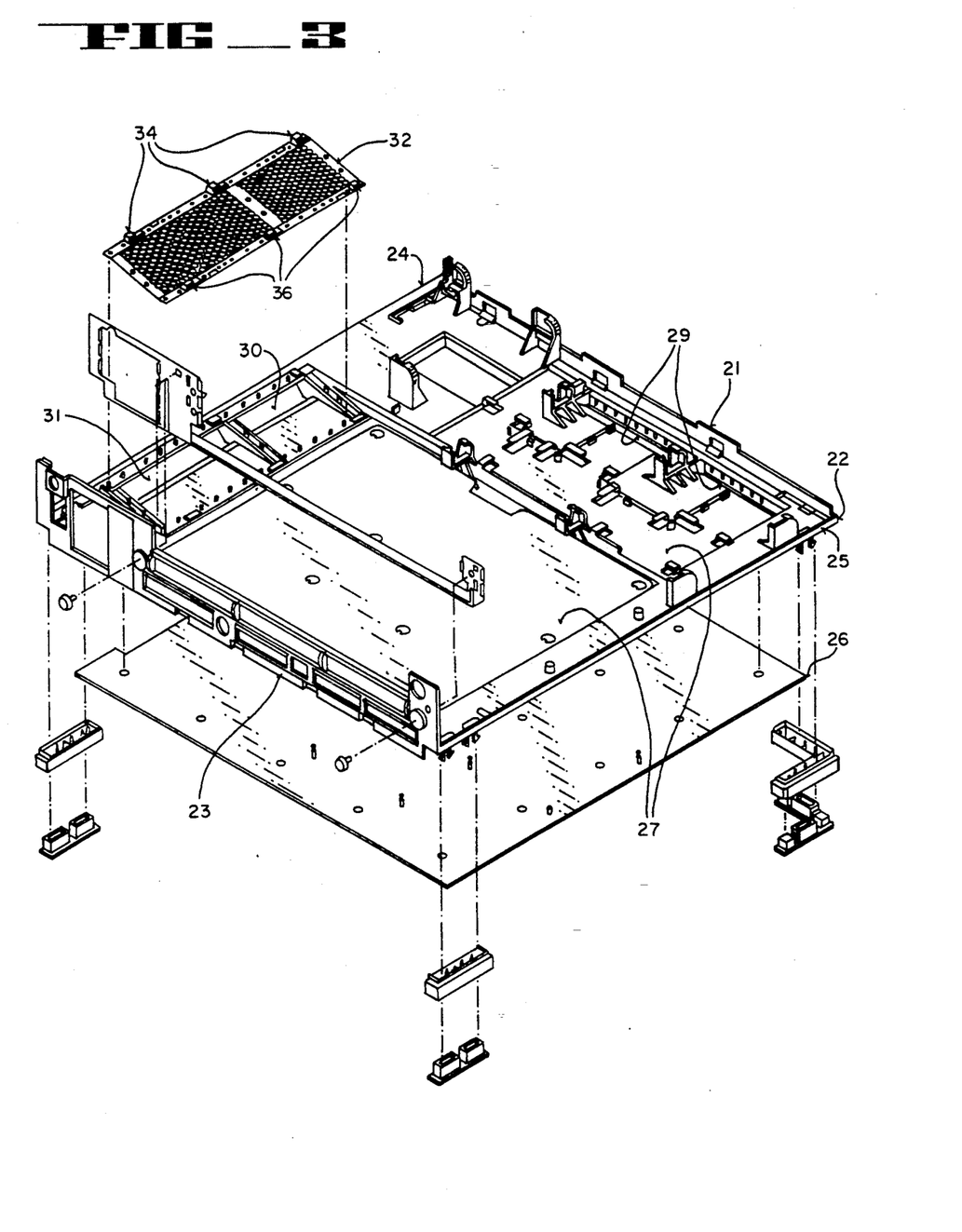
FIG. 3 is a perspective view of the elements of the base.

Referring now to FIG. 3, an exploded view of base 20 is shown. As illustrated, base 20 comprises a main platter 22, reinforced by a sheet metal stiffener 26 which is affixed to the underside of the main platter 22. The main platter 22 includes a front lip 21, a back panel 23 corresponding to the back of the computer housing, a right edge 24, and a left edge 25. The main platter 22 is not uniformly flat, but is instead, recessed with a recessed area 27. Near the right edge 24, the main platter 22 is pierced with air intake hole 30 and air intake hole 31. Disposed over air intake holes 30 and 31 is intake grill 32 which, as described, prevents the entry of foreign substances or objects through air intake holes 30 and 31. Disposed on the top of intake grill 32 are three outer guides 34 and three inner guides 36 which as will be described are used for mounting purposes. Exhaust vents 29 are also provided on main platter 22, and provide additional exhaust means for cooling internal disk drive components installed in the computer. Also shown in FIG. 3 are the feet of the housing, (only three of four are shown in this figure). Each foot is comprised of a foot casing and a damping rubber member disposed within each foot housing.

Figure 4:
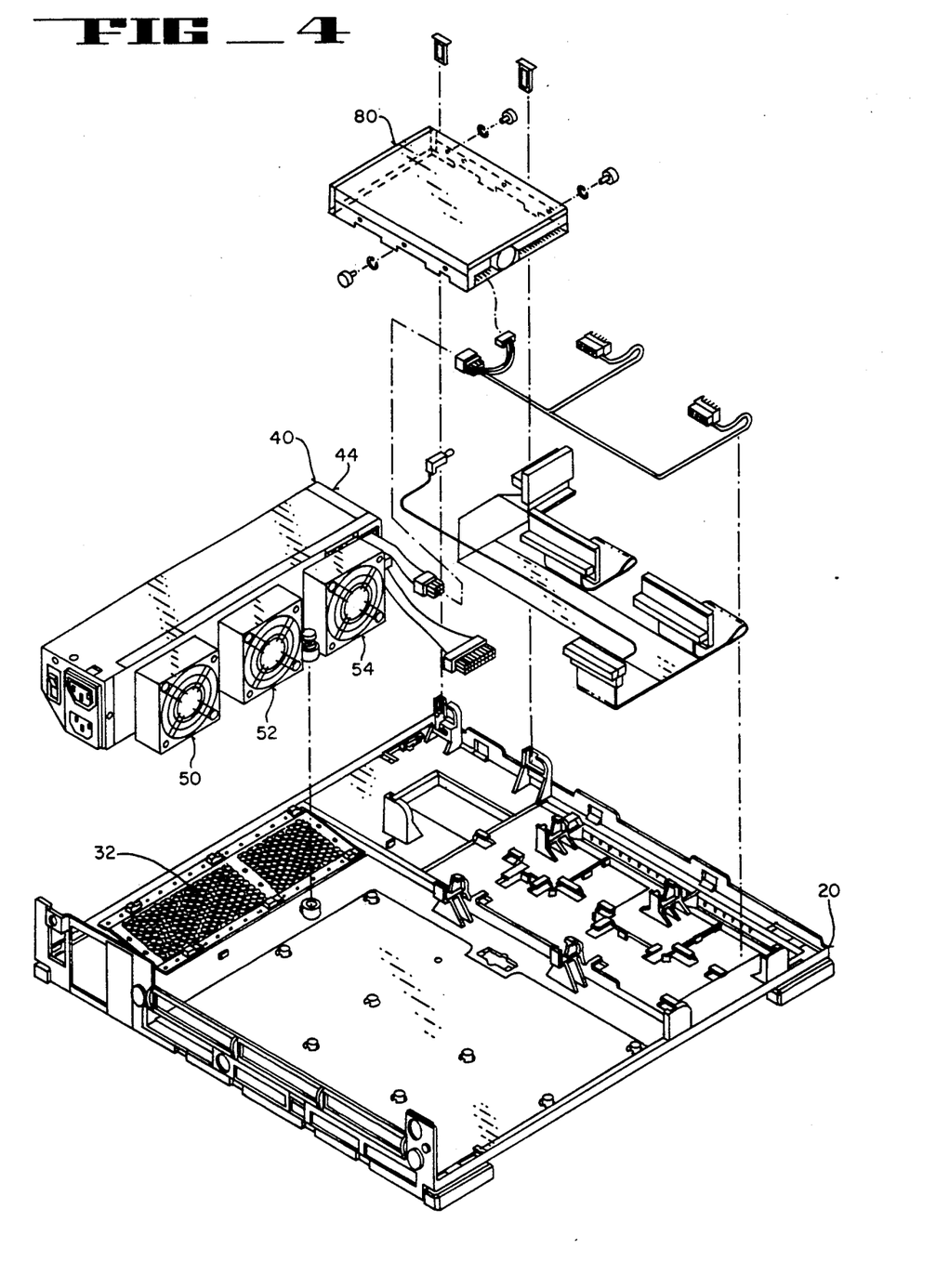
FIG. 4 is a perspective view of the attachment of the power supply and fan array assembly to the base.

Referring now to FIG. 4, this figure illustrates the placement of a power source and fan array assembly 40 on base 20 in accordance with the present invention. As shown in this figure, power source and fan array assembly 40 includes three fans, fan 50, fan 52, and fan 54. Each of these fans is attached to a power source 44 which provides power to the computer. In accordance with the present invention, power source 44 can comprise a high power, resonant frequency power supply delivering, for example, 140 Watts. As shown, power source and fan array assembly 40 is attached to base 20 over air intake grill 32. Also illustrated in FIG. 4 is a floppy disk drive 80 which is attached to base 20 adjacent to power source and fan array assembly 40. It will be appreciated that the opening in the computer housing allowing for the insertion of magnetic disks into floppy disk drive 80 was illustrated in FIG. 2B, and denoted as disk drive opening 70.

Figure 5A:
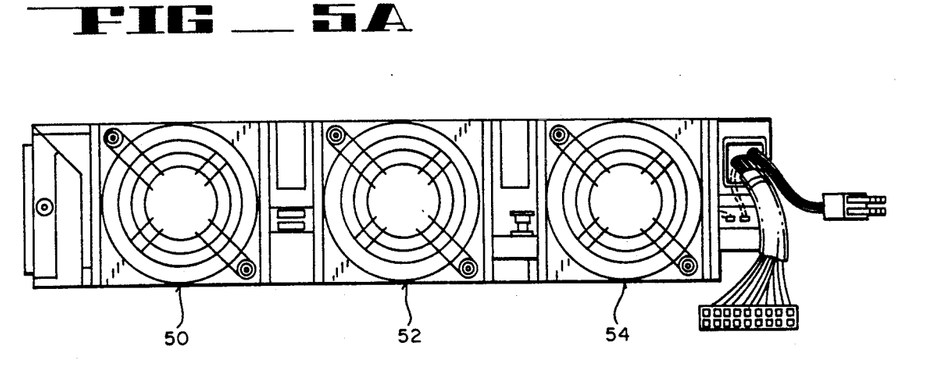
FIG. 5A is a front view of the power supply and fan array assembly.
Figure 5B:
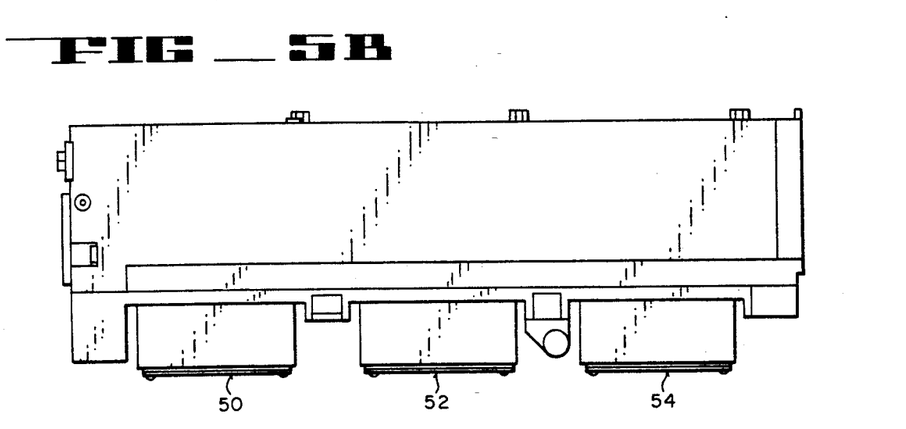
FIG. 5B is a top view of the power supply and fan array assembly.
Figure 5C:
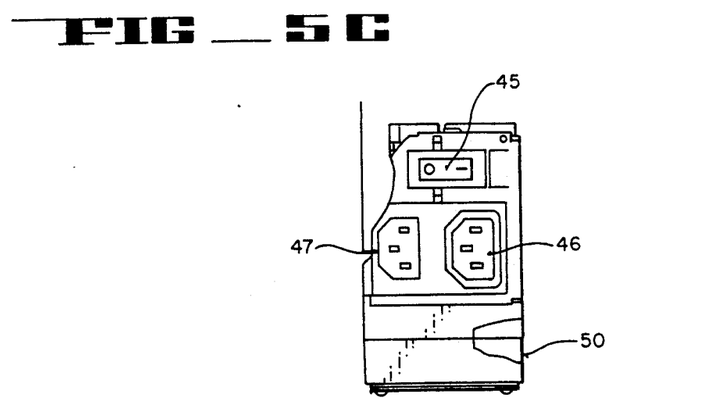
FIG. 5C is a left side view of the power supply and fan array assembly.
Figure 5D:
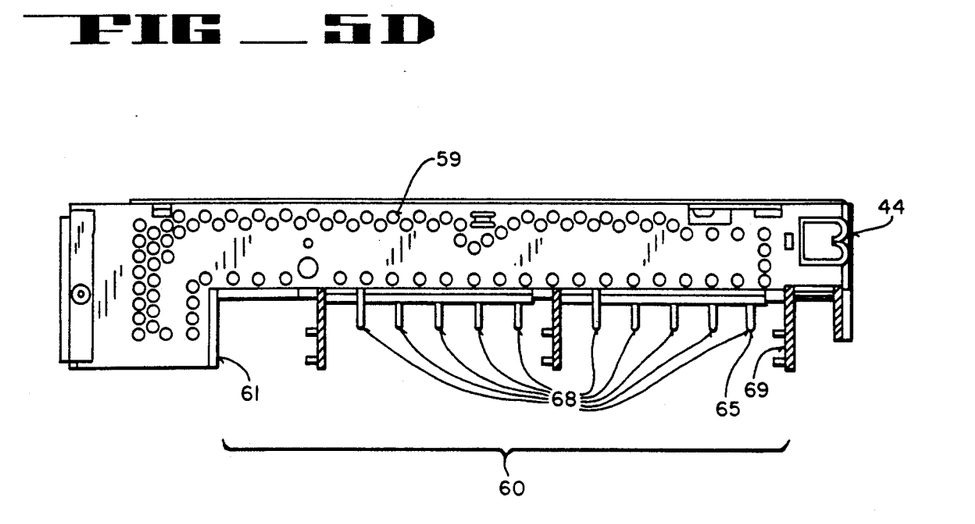
FIG. 5D is a front view of the power supply and fan array assembly (with the fans omitted for illustrative purposes) illustrating the fins under the assembly.
Figure 5E:
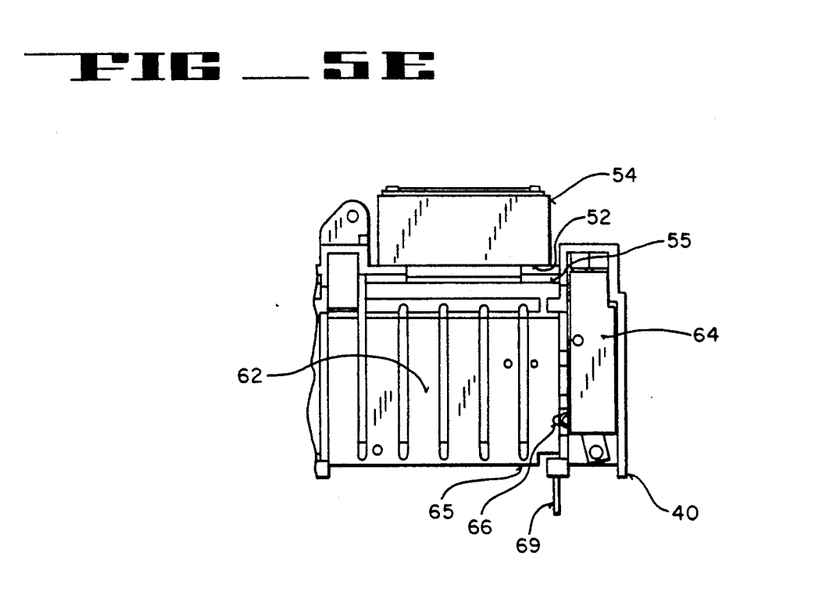
FIG. 5E is a partial view of underside of the power supply and fan array assembly illustrating the fins of the assembly.

With reference to FIG. 5A, a frontal view of power source and fan array assembly 40 is shown illustrating the placement of fan 50, fan 52, and fan 54. FIG. 5B illustrates a top view of power source and fan array assembly 40, again, showing the placement of fan 50, fan 52 and fan 54 on the assembly. FIG. 5C illustrates a left side view of power source and fan array assembly 40 with the fans facing downward. As shown, the left side incorporates a power switch 45, and electrical outlets 46 and 47. With reference to FIG. 5D, this figure illustrates a frontal view of power source and fan array assembly 40, with the three fans 50, 52, and 54 omitted from the figure for illustrative purposes. FIG. 5E shows a portion of the underside of power source and fan array assembly 40, including the underside of fan 54.

Referring now to FIG. 5D, as shown in this figure, the underside of power source and fan array assembly 40 incorporates an air intake plenum 60. In particular, with reference to both FIGS. 5D and 5E, air intake plenum 60 is bounded by the underside 62 of power source 44, wall 61 and wall 69. Air intake plenum 60 is utilized in the present invention to route the flow of air under the power supply 44, thereby dissipating the heat generated by power supply 44. In addition, as shown in FIG. 5D, a plurality of fins 68 are disposed laterally on the underside of power source 44. The fins 68 act as heat sinks for the power source 44, such that the heat produced by power source 44 is sunk into fins 68, and this heat is dissipated, or carried away, through the passage of air over fins 68. Also illustrated in FIG. 5D are the multiple air holes which perforate the back of power source 44 similar in shape and dimension to air hole 59. While not shown in FIG. 5D, air holes similar in number and nature are disposed on the back side 51 of power source 44. These complementary air holes allow for the passage of air through the power source, providing further heat dissipation.

In accordance with the present invention, in order to minimize noise levels and maximize flow efficiency, the fins 68 have rounded edges. Thus, for example, using fin 65 as an example, fin 65 has a rounded front, a rounded rear, and a rounded top spine. In addition, as shown in FIG. 5D, the fins 68 extend only partially from the underside 62 and not to the full height of air intake plenum 60. Extending the fins only partially provides for sufficient heat dissipation, while also minimizing noise levels and maximizing the amount of air input to the fans. With reference to FIGS. 1 and 5B, an additional reduction in noise is accomplished by providing an adequate distance, approximately 5 millimeters, between the back side 51 of power source and fan array assembly 40, and the inner surface 17 of cover 10, when cover 10 is closed over base 20 and the cooling system is operated. An further reduction in noise is accomplished by providing an adequate distance, for example, 5 millimeters, between the intake side of the fans, and the power source 44 to which they are coupled. For example, with reference to FIG. 5E, a clearance distance is provided between intake side 52 of fan 54 and surface 55 of power supply 44.

With reference to FIGS. 5E, this figures further illustrates a thermistor 66 coupled to power source and fan array assembly 40. As will be described, in accordance with the present invention, thermistor 66, or other equivalent transducing means, is used to sense the outside ambient temperature and provide an electrical signal indicative of the ambient temperature to a fan control circuit. The fan control circuit, in turn, controls and adjusts the speed of fan 50, fan 52, and fan 54 based upon this ambient temperature. At higher outside ambient temperatures, these fans are provided with greater voltages, and accordingly spin at higher speeds. Thus, in the computer housing with cooling system of the present invention, the speed of the fans are responsive to the outside ambient temperature. In reference to FIG. 5E, the thermistor 66 can, for example, be disposed against the wall 69, and the fan control circuit located within an adjacent circuit housing 64.

Figure 6A:
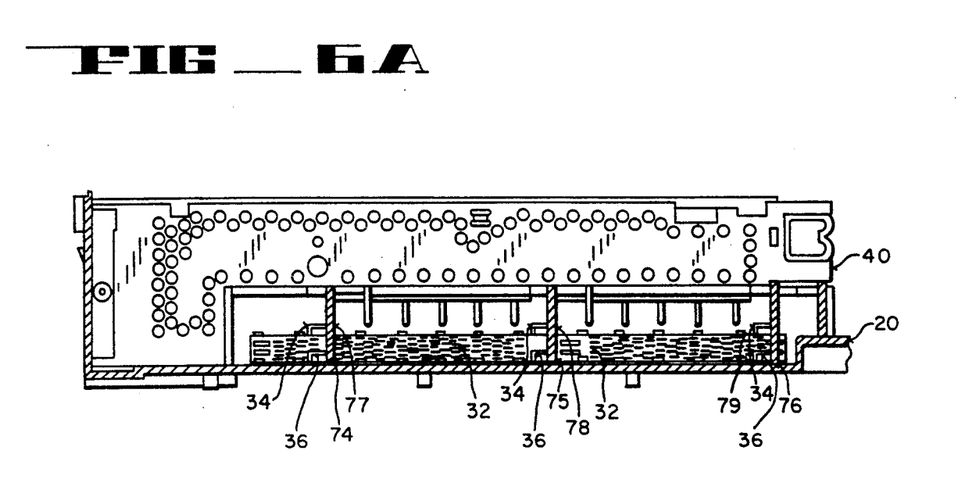
FIG. 6A is a front view of the power supply and fan array assembly (with the fans omitted for illustrative purposes) when attached to the base.
Figure 6B:
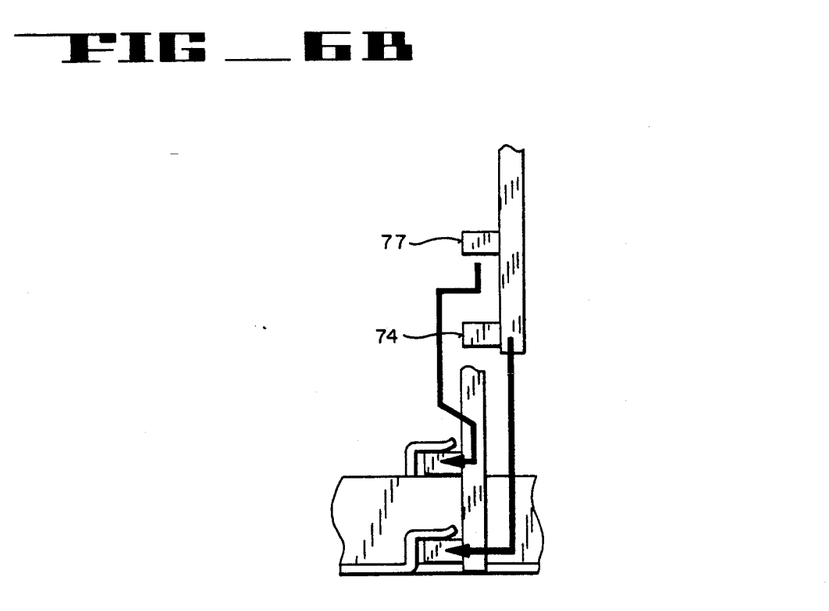
FIG. 6B illustrates the attachment of a foot on the power supply and fan array assembly to the base.

Referring to FIGS. 6A and 6B, and FIG. 4, the installation and placement of the power source and fan array assembly 40 will now be described. The power source and fan array assembly 40 is first loosely placed in a vertical downward direction until the bottom of feet 74, 75, 76, 77, 78, and 79 are in contact with the base 20. More particularly, feet 74, 75, 76, 77, 78, and 79 are aligned with the three outer guides 34 and the three inner guides 36 disposed on the air intake grill 32. The power source and fan array assembly 40 is then moved horizontally until a stop is reached with respect to the three outer guides 34 and the three inner guides 36. FIG. 6B illustrates the preceding process with respect to the feet 74 and 77. With reference briefly to FIG. 1, the top of power source and fan array assembly 40 is additionally tightly sealed against the cover 10 when it is closed over base 20 to prevent air recirculation. The sealing of the power source and fan array assembly 40 against the closed cover 10 can be accomplished through the use of matting on the top of power source and fan array assembly 40. When the cover 10 is closed against the base 20, the matting comes into contact with the cover 10 and provides for a tight seal.

Figure 7:
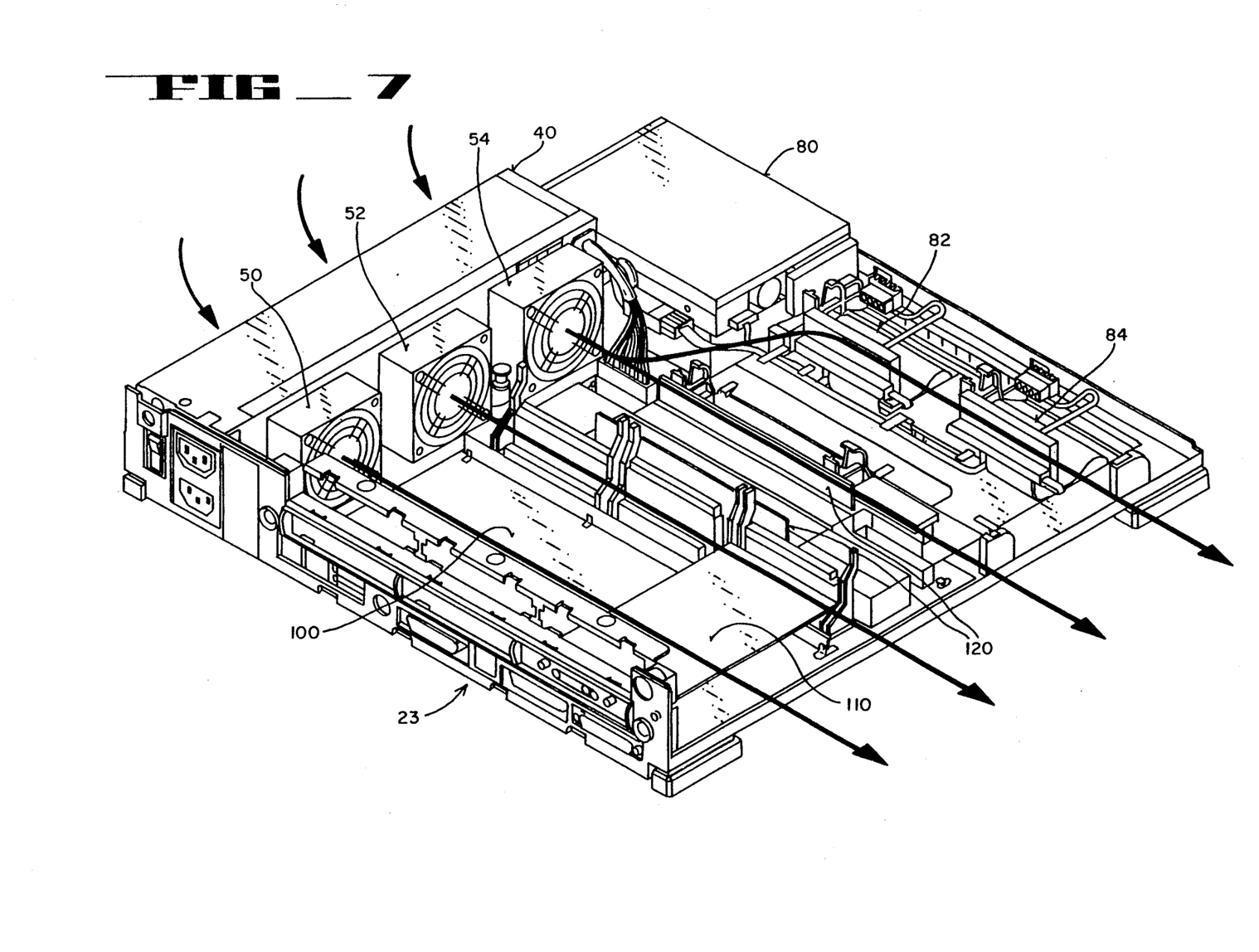
FIG. 7 illustrates the power supply and fan array assembly in relationship to the other components in the workstation also attached to the base, as well as the air flow through the housing.

With reference to FIG. 7, this figure illustrates the placement of the power source and fan array assembly 40 in relationship to the heat producing components of the computer system, as well as the flow of air through the housing of the present invention. The placement of the components in the computer system will be described first. As shown in FIG. 7, and previously described, the floppy disk drive 80 is coupled to base 20 adjacent to power source and fan array assembly 40. In addition, disposed in front of fan 50, fan 52, and fan 54 is a motherboard 100, a bus card 110, and single in line memory modules (SIMMS) 120. Not shown in FIG. 7, but also coupled to base 20 in the computer of the present invention are two internal disk drives, with capacities, for example, of 400 MBytes, each upgradable to 1 GByte or more. These two internal disk drives are coupled to base 20 and disposed within the cavities denoted in FIG. 7 with reference numerals 82 and 84.

Figure 9A:
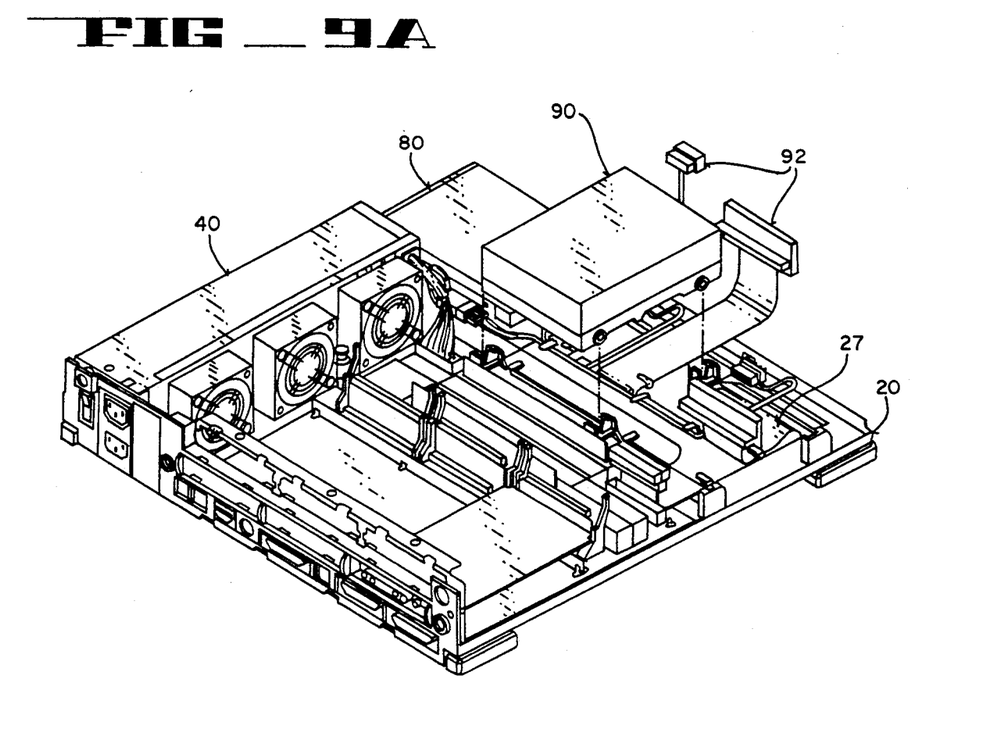
FIGS. 9A and 9B illustrate the placement and attachment of a disk drive within the workstation of the present invention.
Figure 9B:
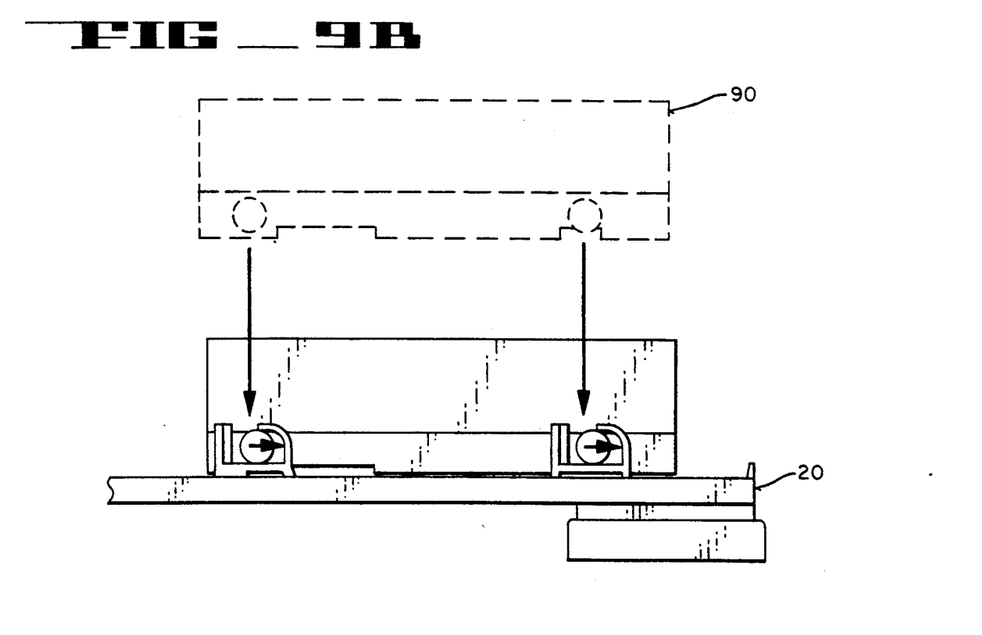

Referring briefly to FIGS. 9A and 9B, these figures illustrate the installation of one of these two internal disk drives, internal disk drive 90, in cavity 82. As shown in FIG. 9A, connecting cables 92 are laid flat beneath the internal disk drive 90. The cables 92 are then attached to disk drive 90, and the internal disk drive is affixed to the base 20 as shown in FIG. 9B. Recessed area 27 in base 20 provides for the passage of air underneath internal disk drive 90 and out the exhaust vents 29 (see FIG. 3), thereby facilitating the dissipation of heat generated by internal disk drive 90.

Figure 10A:
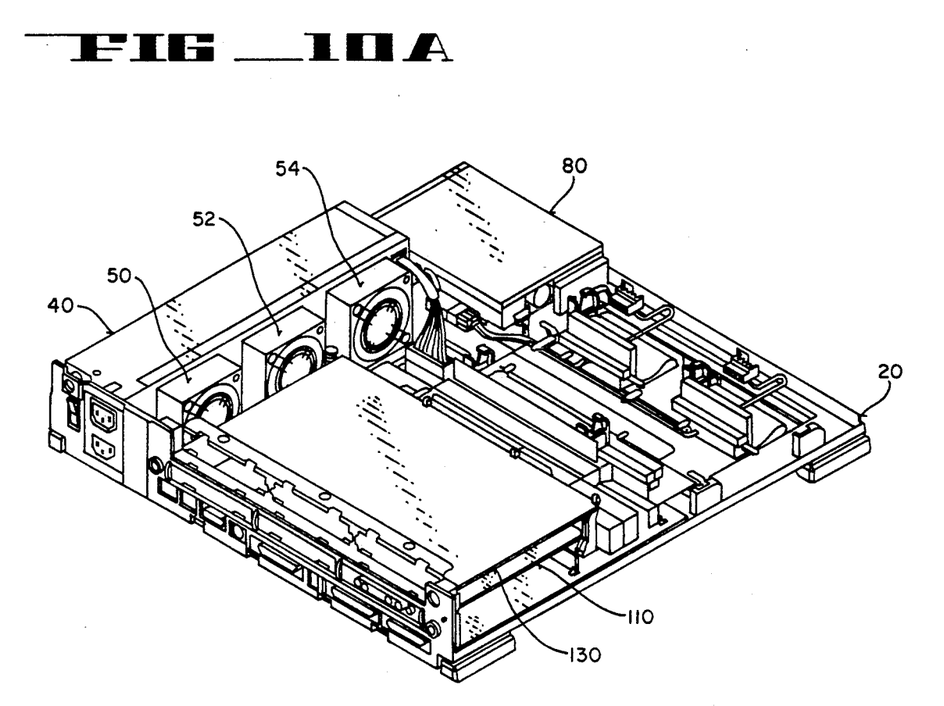
FIGS. 10 and 10B illustrate the placement and attachment of two tiers of bus boards in the computer housing of the present invention.
Figure 10B:
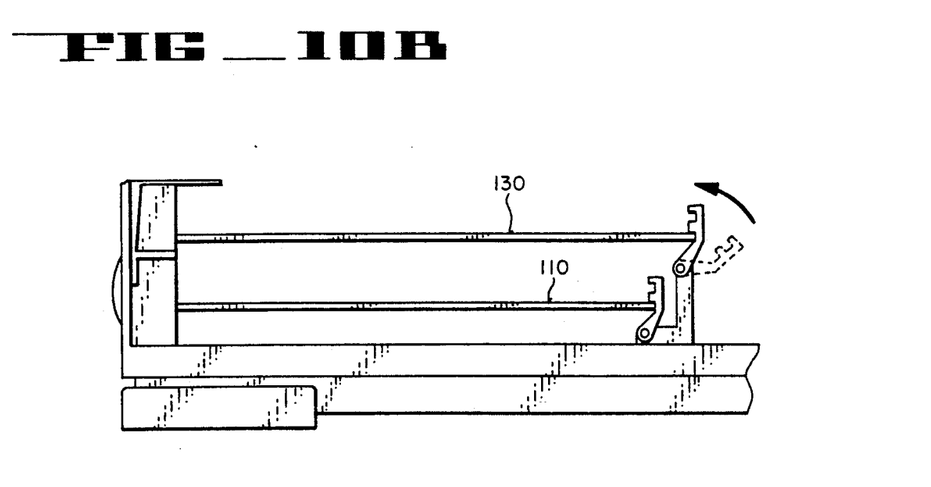
Figure 11:
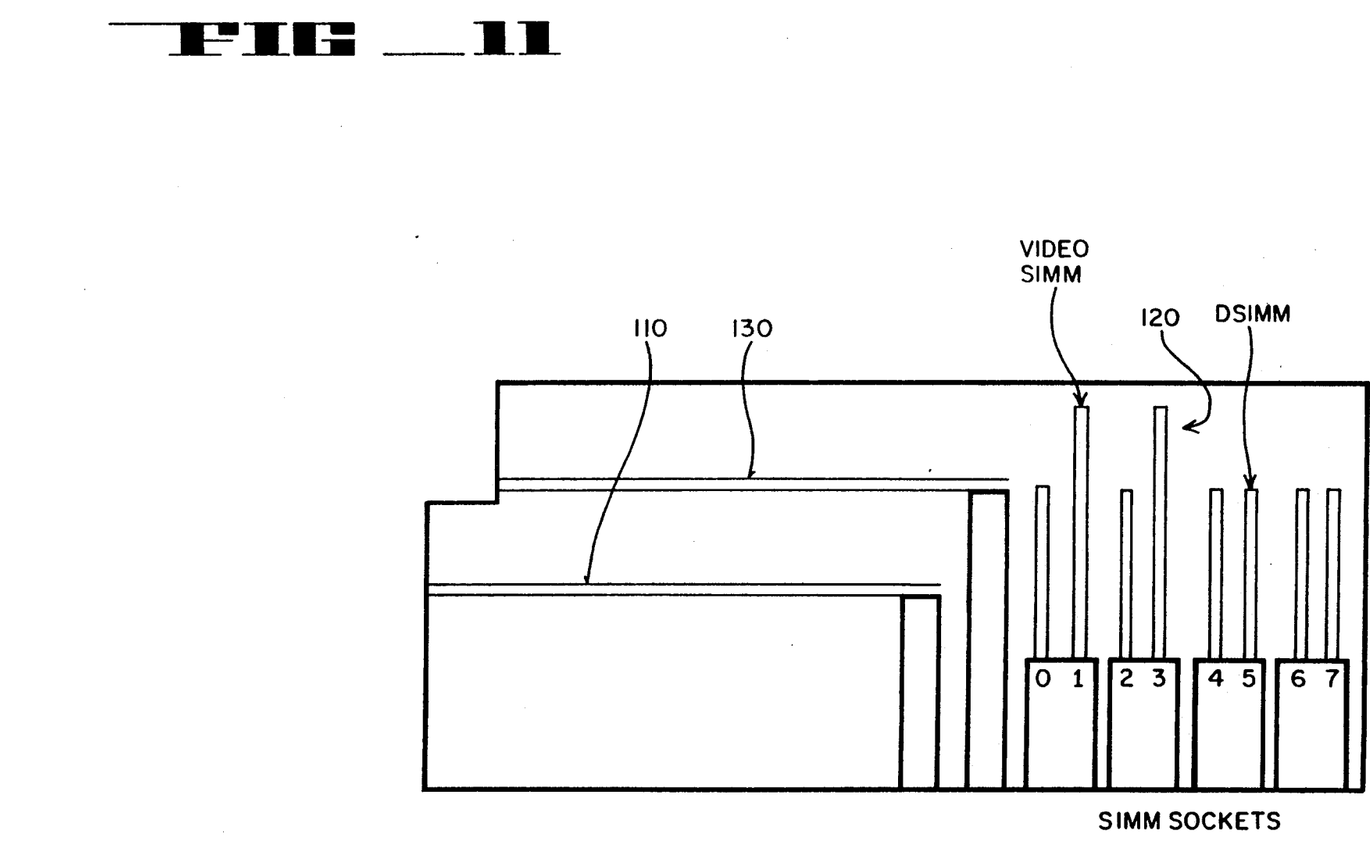
FIG. 11 illustrates the relationship between the orientation of the bus boards and the memory SIMMS in the computer housing of the present invention.

Returning to FIG. 7, also not shown in this figure is the placement of a second bus card 130 above bus card 110. Referring briefly to FIGS. 10A and 10B, these figures illustrate the placement and installation of the second bus card 130 over the first bus card 110. With reference to FIG. 10A, it will be appreciated that the two bus cards 110 and 130 are oriented with respect to fans 50, 52, and 54 such that heat dissipating air can flow directly both above and below each of these cards. FIG. 11 further illustrates this tiered placement of bus cards 110 and 130, as well as the placement of the SIMMS 120.

The operation of the cooling system of the present invention will now be described. With reference to FIGS. 1, 2B, 3, 5D, 6A, 6B, and 7, in accordance with the present invention, air enters the computer housing through vent array 19 and air hole intakes 30 and 31. The air is then channeled through air intake plenum 60 on the underside of power source and fan array assembly 40. This channeling of the air under the power source 44 serves dissipates the heat generated by power source 44. In particular, the air is channeled over the fins 68, dissipating the considerable amount of heat generated by power source 44. Thus, the air is channeled under the power source 44. Air is additionally passed through the complementary air holes on power source 44. The fans then blow the air across the housing, cooling the components disposed in front of the fans, and the air exits the housing through vent array 16 disposed on the right surface of cover 10 and to a more limited extent, exhaust vents 29.

Figure 8:
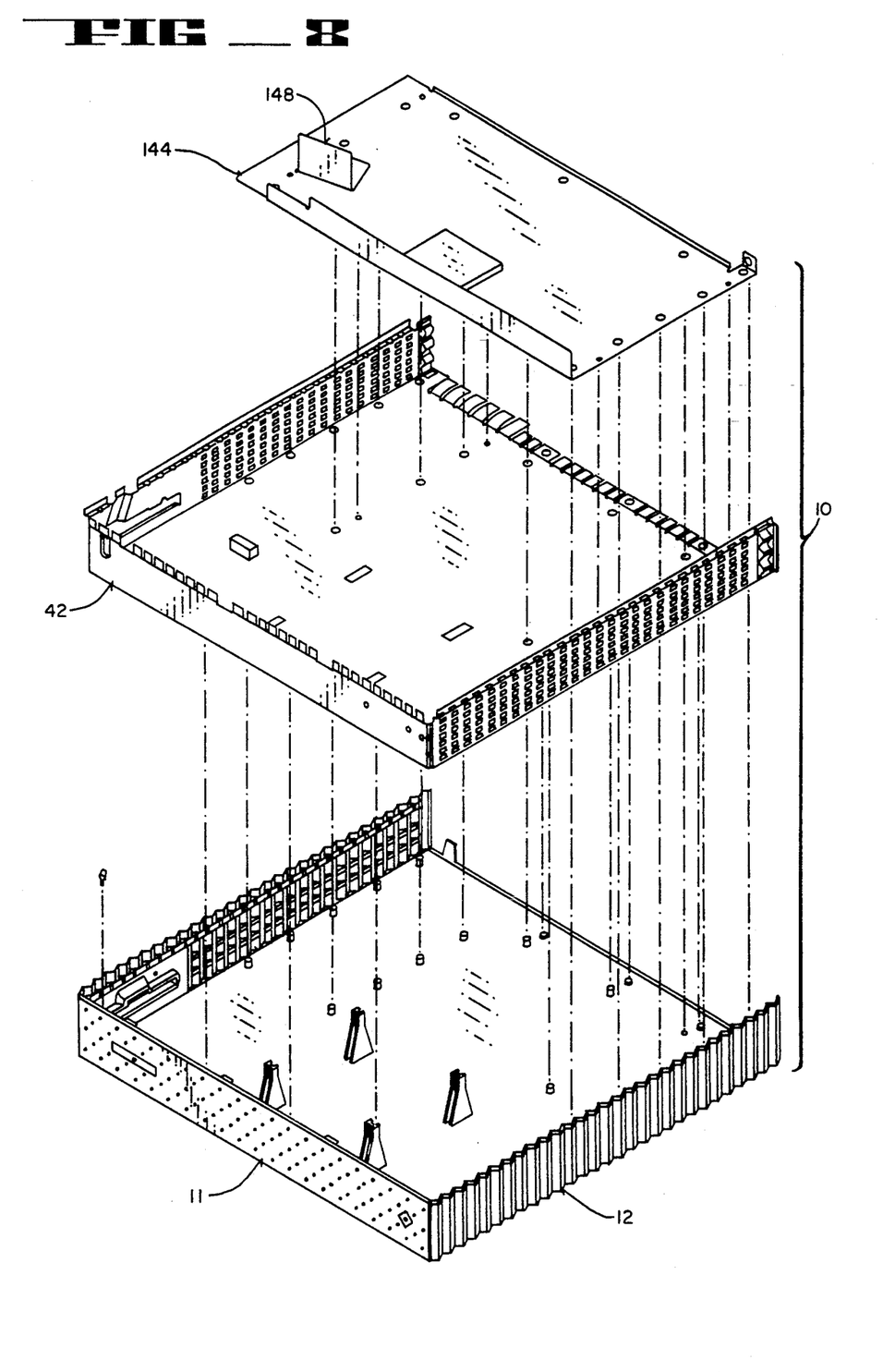
FIG. 8 illustrates the three members which comprise the cover, including a deflector.

The flow of the air through the housing of the present invention is denoted with the arrows shown in FIG. 7. As illustrated, the flow of air from fan 54 is divided to cool the components which are not directly in front of fan 54. In accordance with the present invention, this separating of the air is accomplished through the use of a deflector disposed on the cover 10. Referring now to FIG. 8, this figure illustrates the composition of cover 10. As shown in this figure, cover 10 with front surface 11 and left surface 12 in view, is constructed of an outer shell 140 joined to a liner 142, which is in turn, reinforced with a stiffener sheet 144 affixed to the liner 142. Disposed on the stiffener sheet 144 is deflector 148. It will be appreciated, particularly through reference to both FIG. 8 and FIG. 1, that when cover 10 is closed with respect to base 20, deflector 148 serves to deflect and channel the flow of air leaving fan 54. Thus referring to FIGS. 7 and 8, the deflector 148 serves to deflect the flow of air leaving fan 52, and channels the air as shown in FIG. 7.

With reference to FIG. 7, as shown in this figure, and previously described, three fans 50, 52, and 54 are connected to the power supply 44. It will be appreciated that with the number and nature of the components in the computer housing of the present invention, a substantial amount of air flow through the housing is needed to properly dissipate heat. Rather than use of a single, large fan (using precious space) or small fans operating at high speeds (which generate undesirable noise), the cooling system of the present invention incorporates three moderately sized fans, each operating at low fan speeds to produce less noise.

Additionally, in contrast to prior art computer cooling systems, in accordance with the present invention, fan 50, fan 52, and fan 54 are each operated at a different fan speed, with each fan being supplied with a different voltage from a fan control circuit. The use of three fans, each operating at a different speed, produces for each fan, a slightly different audible frequency. If all three fans operated at the same speed, their audible frequencies would add together logarithmically, and a higher noise level would result. In contrast, with each fan operating at a different speed, substantial air flow is provided and the undesirable summation of noise is avoided and produces a desirable low noise level.

To further reduce noise, in accordance with the present invention, rather than constantly operating fan 50, fan 52, and fan 54 at speeds which guarantee adequate heat dissipation under worst case scenario conditions, the fan speeds are varied in response to the outside ambient temperature. By varying the fan speeds in response to the outside temperature, the present invention provides for the operation of the cooling system fans at very low speeds when the outside ambient temperature is at normal room temperature or below. This design insures that over a large range of normal operating conditions, the cooling system will be operating at a very low noise level. It is only under unusual, or higher than room temperature conditions do the cooling fans reach their fastest speed and as a result, noisiest mode of operation. Returning briefly to FIG. 5E, it will be recalled that the thermistor 66 provides a fan control circuit housed in housing 64 with electrical signals indicative of the outside ambient temperature. Thermistor 66 thereby provides the fan control circuit with this input, and in response, the fan control circuit adjusts the voltages supplied to fan 50, fan 52, and fan 54. Thus, the fan speeds are adjusted in response to the outside ambient temperature.

Additionally, with reference to FIGS. 7 and 9A, the speeds for fan 50, fan 52, and fan 54 are advantageously set in accordance with the heat dissipation needs of the components disposed in front of each fan. Thus, fan 50 spins at the fastest speed due to the cooling needs of motherboard 100 and bus card 110 which require substantial air velocities over them. Fan 52 spins the second fastest, contributing to the cooling of these components and memory modules 120, while fan 54 spins at the slowest speed, having to principally dissipate the bulk heat generated by the internal disk drives, for example disk drive 90.

While the present invention has been particularly described with reference to FIGS. 1 through 11, and with emphasis on certain computer components, it should be understood that the figures are for illustration only and should not be taken as limitations upon the invention. It is further contemplated that many changes and modifications may be made to the invention, by one of ordinary skill in the art, without departing from the spirit and scope of the invention as disclosed herein.

We claim:

1. A computer housing with a low noise cooling system comprising:
    a base, said base having disposed upon it intake hole means for intaking air;
    a cover coupled to said base, said cover having a first surface, a second surface, a third surface, a fourth surface, and a fifth surface, wherein said first surface is perforated with a first plurality of vents and said second surface is perforated with a second plurality of vents;
    a power source for providing power, said power source coupled to said base, said power source having a first side and a second side, wherein said second side is physically disposed over said intake hole means;
    a plurality of computer components disposed upon said base;
    a plurality of fans linearly disposed upon said first side of said power source such that said plurality of fans, when operating, cause air to flow through said intake hole means and said first plurality of vents, channeled under said power source, across said second side of said power source, then blow across said plurality of computer components, and output through said second plurality of vents.

2. The computer housing with a low noise cooling system as provided in claim 1 wherein each of said plurality of fans simultaneously operates at a different fan speed such that an undesirable summation of noise from each one of said plurality of fans is avoided and an overall low noise level is achieved.

3. The computer housing with a low noise cooling system as provided in claim 1, further comprising a plurality of heat sinking fins, said heat sinking fins disposed upon said bottom side of said power source.

4. The computer housing with a low noise cooling system as provided in claim 3, wherein each of said plurality of heat sinking fins has a front surface, a back surface, and a top surface, and each of said surfaces is rounded to reduce noise caused by the passage of air across said fins.

5. The computer housing with a low noise cooling system as provided in claim 4, further comprising ambient temperature sensing means, wherein said ambient temperature sensing means senses a temperature and adjusts the turning speed for each of said plurality of fans in response to said temperature.

6. The computer housing with a low noise cooling system as provided in claim 5 wherein said plurality of fans comprises three fans, each of said three fans simultaneously operating at a different fan speed such that an undesirable summation of noise from each one of said plurality of fans is avoided and an overall low noise level is achieved.

7. The computer housing with a low noise cooling system as provided in claim 6, wherein said first plurality of vents comprises a first plurality of rectangular shaped vents.

8. The computer housing with a low noise cooling system as provided in claim 7, wherein said second plurality of vents comprises a second plurality of rectangular shaped vents.

9. The computer housing with a low noise cooling system as provided in claim 8, further comprising a deflector means for deflecting the flow of air within said housing, said deflector means disposed upon said fifth surface of said cover wherein the flow of air from one of said three fans is deflected by said deflector means.

10. The computer housing with a low noise cooling system as provided in claim 9, further comprising means for passing air through said power source, and wherein said three fans, when operating, cause air to flow through said means for passing air through said power source, across said plurality of computer components, and out through said second plurality of vents.

11. A method for cooling a plurality of computer components and a power source within a computer housing comprising the steps of:
utilizing a plurality of fans disposed upon said power source, each one of said plurality of fans simultaneously operating at a different fan speed such that noise is reduced, to accomplish the following steps in the following order;
causing air to be taken from outside of said computer housing into said computer housing through a first plurality of vents;
channeling said air under said power source;
blowing said air across said plurality of computer components;
passing said air out of said computer housing though a second plurality of vents.

12. The method for cooling a plurality of computer components and a power source within a computer housing as provided in claim 11, wherein said channeling of air under said power source is routed across a plurality of heat sinking fins disposed on an underside of said power source.

13. The method for cooling a plurality of computer components and a power source within a computer housing as provided in claim 12, further comprising the step of:
adjusting the speed for each one of said plurality of fans in response to the ambient temperature outside of said computer housing.

14. The method for cooling a plurality of computer components and a power source within a computer housing as provided in claim 13, further comprising the step of:
deflecting the flow of air blown across said plurality of computer components, thereby dividing the air blown across said plurality of computer components.

15. The method for cooling a plurality of computer components and a power source within a computer housing as provided in claim 14, wherein said first plurality of vents comprises a first plurality of rectangular shaped vents and said second plurality of vents comprises a second plurality of rectangular shaped vents.

16. A computer housing with a low noise cooling system comprising:
a base, said base having disposed upon it intake hole means for intaking air;
a cover coupled to said base, said cover having a first surface, a second surface, a third surface, a fourth surface, and a fifth surface, wherein said first surface is perforated with a first plurality of vents rectangular in shape and said second surface is perforated with a second plurality of vents rectangular in shape;
a power source for providing power, said power source coupled to said base, said power source having a first side and a second side, wherein said second side is physically disposed over said intake hole means;
a plurality of computer components disposed upon said base;
a first fan disposed upon said first side of said power source, a second fan disposed upon said first side of said power source, a third fan disposed upon said first side of said power source, wherein said first, second and third fans, are linearly disposed upon said first side of said power source adjacent to one another, such that said first, second, and third fans, when operating, cause air to flow through said intake hole means and said first plurality of vents, under said power source, across said second side of said power source, across said plurality of computer components, and out through said second plurality of vents.

17. The computer housing with a low noise cooling system as provided in claim 16, wherein said first fan, said second fan, and said third fan each operate simultaneously at a different fan speed such that an undersirable summation of noise from each one of these fans is avoided and an overall low noise level is achieved.

18. The computer housing with a low noise cooling system as provided in claim 17, wherein said plurality of computer components includes a motherboard, a memory module, and a disk drive module disposed upon said base such that said first fan turns at a first fan speed and blows air across said motherboard, said second fan turns at a second speed, slower than said first speed, and blows air across said memory module, and said third fan turns at a third speed, slower than said second speed, and blows air across said disk drive module.

* * * * *